United States Patent [19]

Tieman

[11] Patent Number: 5,673,611
[45] Date of Patent: Oct. 7, 1997

[54] SLOW COOKER FOODSTUFF LIFTER

[76] Inventor: Frank Tieman, 41904 Davenport St. NE., Braham, Minn. 55006

[21] Appl. No.: 686,449

[22] Filed: Jul. 25, 1996

Related U.S. Application Data

[63] Continuation of Ser. No. 503,434, Jul. 17, 1995, abandoned.

[51] Int. Cl.⁶ ........................................... A47J 37/04
[52] U.S. Cl. ...................... 99/413; 99/414; 99/415; 99/424; 99/449; 211/181; 220/489
[58] Field of Search ...................... 99/403, 413, 449, 99/418, 424, 410, 393, 394, 396, 402, 414, 415, 431; 211/181; 220/486, 489, 472, 491, 492, 493

[56] References Cited

U.S. PATENT DOCUMENTS

| | | |
|---|---|---|
| 1,495,594 | 5/1924 | Hutchins ............................ 99/410 |
| 1,848,929 | 3/1932 | Berg .................................. 220/489 |
| 2,086,475 | 7/1937 | Powell ................................. 99/403 |
| 2,809,767 | 10/1957 | Michalsky ......................... 220/486 |
| 2,812,098 | 11/1957 | Escaut ............................... 220/489 |
| 2,942,750 | 6/1960 | Neely ................................ 220/489 |
| 4,026,435 | 5/1977 | Hendon .............................. 99/403 |
| 4,735,135 | 4/1988 | Walker ............................... 99/424 |
| 4,741,262 | 5/1988 | Moncrief ........................... 211/181 |

*Primary Examiner*—David Scherbel
*Assistant Examiner*—James F. Hook
*Attorney, Agent, or Firm*—J. R. Cwayna

[57] ABSTRACT

A foodstuff lifter for slow cooker units which units are normally of deep sided configuration. The lifter includes a lower, footed, rack member and an upper ring member which members are attached through flexible links or through solid links which permit collapse of the members into substantially flat condition after the foodstuff has been removed from the cooking unit or similarly for storage or shipping.

12 Claims, 2 Drawing Sheets

SLOW COOKER FOODSTUFF LIFTER

This application is a continuation of application Ser. No. 08/503,434 filed Jul. 17, 1995, now abandoned.

RELATED APPLICATIONS

Applicant has no related applications that should be considered with regard to the invention disclosed herein and is not aware of any other applications that pertain to this invention.

SPONSORSHIP

This invention is not made under any Federally or any other sponsored research and development arrangment.

1. Field of the Invention

A lifter for foodstuffs which are cooked in a deep sided container having a lower, gridded, substantially flat, footed lower element and an upper element flexibly connected thereto with the flexible linkage between elements permitting substantially total collapse of the upper to the lower element to assume a generally flattened, low profile condition for shipping, storage and foodstuff access.

2. Short Summary of the Invention

Many persons cook with what are known as slow cooking units. These units are normally deep sided and therefore, it is often difficult to retrieve the foodstuff after cooking.

With the applicant's invention, a lower, grid, or at least runged, footed, foodstuff supporting element, shaped to fit the container is provided with an upper, open element flexibly attached thereto, shaped to fit the container or rest upon a ledge provided by the container with a flexible lingage therebetween allowing the two elements to be collapsed upon one another to provide a substantially pancaked or flat configuration to allow access to the foodstuff and for storage and shipping.

The lower element substantially conforms to the internal shape of the container and has feet thereon to elevate the foodstuff, during cooking, above the bottom of the unit and is runged or gridded to allow liquid to circulate in the container.

Such slow cookers are usually deep, slope sided and often include an internal ledge and the upper element of the invention conforms to the shape of the container, is slightly large than the lower element to engage the side of the container or to rest upon such ring. At least a single handle is provided with the upper element to assist in lifting and this handle is maintained in accessible position by the upper element being so located.

Linkage is provided between the upper and lower elements and the linkage permits the collapsing of the two elements into a substantially flat configuration. These links may be flexible or solid to provide a proper connection between the elements and allow for collapsing.

BACKGROUND AND OBJECTS OF THE INVENTION

Various devices have been provided for the removal of foodstuffs from a cooking unit. These include cooking racks, handled cooking racks and perforate baskets. The primary aspect of all such devices is to provide a means for retrieval of the foodstuff while allowing liquids to remain in the cooker.

Applicant has found no such unit which allows for complete collapsibility while accomplishing the desired removal results.

With applicant's device the unit provides a lower, footed element upon which the food is placed for cooking while maintaining the same above the bottom of the container and which allows for liquid draining and an element flexibly linked thereto, having a handle or handles, which is maintained in elevated position with respect to the bottom element during cooking such that the handle or handles are available for removal of the unit and foodstuffs after cooking.

It is therefore an object of the applicant's invention to provide a foodstuff lifter particularly adapted to deep-sided cookers having a lower, food supporting element and an upper, open element flexibly linked thereto.

It is a further object of the applicant's invention to provide a foodstuff lifter adapted to deep-sided cookers having a lower, food supporting element and an upper, open element of slightly large configuration than the lower element to engage a portion of the cooker to remain user accessible for food removal following cooking.

It is still a further object of the applicant's invention to provide a foodstuff lifter and cooking support device which is substantially collapsible into a relatively flat condition for access to the cooked food, storage and shipping.

These and other objects and advantages of the applicant's invention will more fully appear from a consideration of the accompanying drawings and description.

DESCRIPTION OF A PREFERRED FORM OF THE INVENTION

Figures 1, 2:
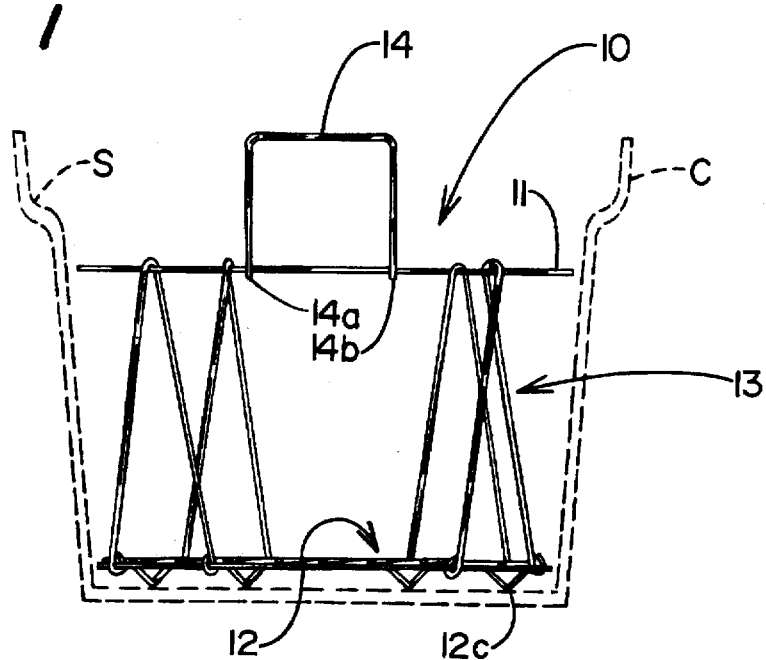
FIG. 1 is a side elevation of the foodstuff lifter embodying the concepts of the applicant's invention as the same would be used in a cooking pot, the pot being shown in dotted lines.
FIG. 2 is a top plan view of FIG. 1 showing the lifter in extended position or open position and eliminating the pot.

In accordance with the accompanying drawings applicant's foodstuff lifter is designated in its entirety 10 and is illustrated in a cooking unit C, illustrated in dotted lines in FIG. 1. As illustrated therein, the lifter 10 provides a pair of, generally circular members providing an upper element 11 and a lower element 12 which are joined through a plurality of connective links 13 which are of various forms as shown in the side elevations of FIGS. 5, 6. The connective elements 13 are, in all illustrated forms, constructed to allow collapse of the upper element 11 onto or about the lower element 12 for storage, shipping, etc.

As illustrated, the upper element 11 defines a ring and is provided with two handles 14, 15 pivotally attached thereto. The handles 14, 15 each include a U-shaped, formed wire member having the end portions of each of the legs 14a, 14b, 15a, 15b formed to encircle the ring 11 to permit movement of the handles 14, 15 relative thereto.

Figure 7:
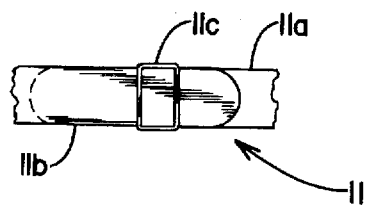
FIG. 7 is a side view of a portion of the upper lifter element illustrating a mechanism for modifying the size of the same.

As illustrated in FIG. 7, a simple method for modifying the size of upper element 11 is provided. As illustrated therein, upper element 11 is not endless but has a pair of ends 11a, 11b and an encircling clip 11c which permits sliding of the ends 11a, 11b relative to one another. With such an adjusting concept, the size of ring 11 may be modified to engage the side of a sloping cooker C or to overlie and rest upon a shoulder S which often is available in such cookers.

The sizing adjustment is obviously available no matter what the cross section of the material from which ring 11 is formed.

The lower lifter element 12 is again, a generally circular ring and provides a plurality of cross members 12a in spaced relation thereacross. Although the cross members 12a are illustrated as being parallel and arranged in one direction, it should be obvious that these members 12a could criss-cross to form a grid without departing from the scope of the invention, the primary intent being to provide a carrying surface for foodstuffs placed thereon.

Figure 3:
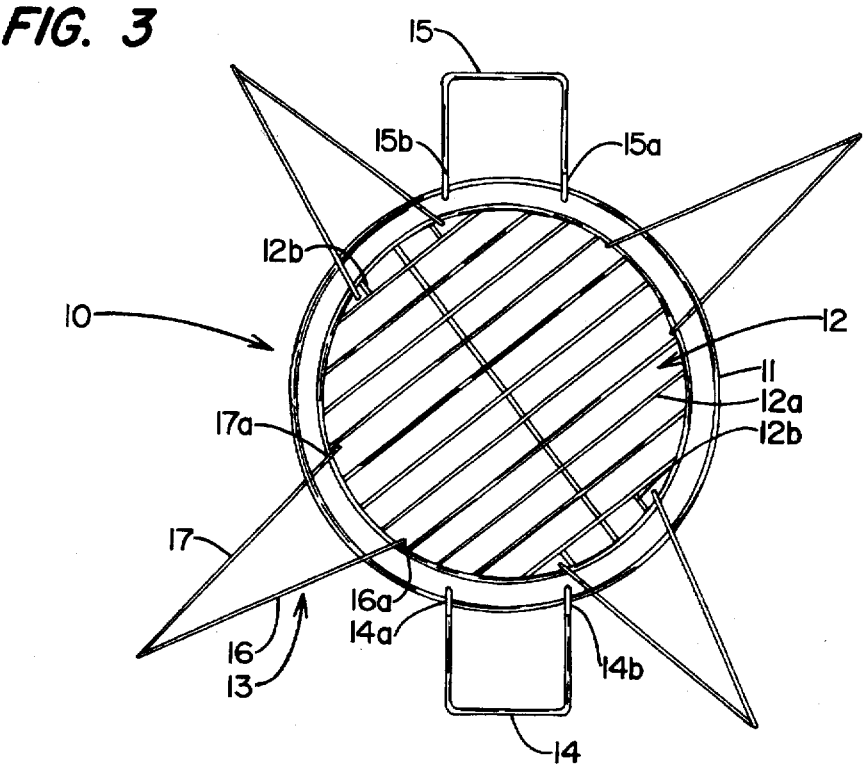
FIG. 3 is a top plan view of the lifter in collapsed position.
Figure 4:
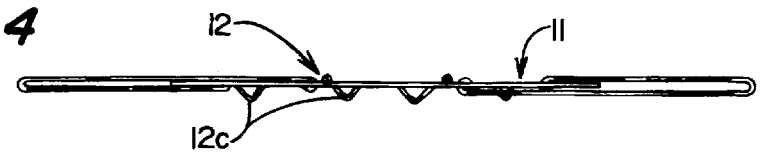
FIG. 4 is a side elevation of the lifter in collapsed position.

As illustrated in FIG. 3, blocking members 12b may be arranged transversely from one of such cross members 12a to the ring 12 to act as a slide preventing device for one type of connective 13 member.

Arranged on the bottom of the lower lifter element 12 are a plurality of feet members 12c which may be formed integrally with selected of the cross members 12a.

The connective members 13 all are designed to permit collapsibility of the upper lifter element 11 down, over or about the lower element 12 such that the same will take on a low profile, collapsed arrangement.

Figure 5:
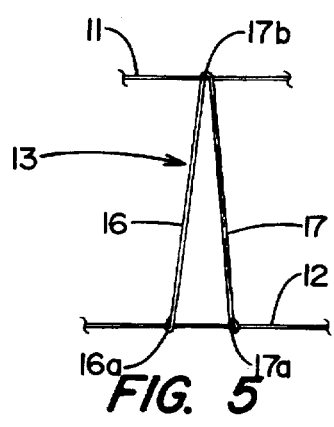
FIG. 5 is a side elevation of one form of connective device between the upper and lower lifter elements.

A first form of such connective element 13 is illustrated in FIG. 5

As shown therein, connective member 13 includes a formed, triangular configuration consisting of a pair of legs 16, 17 with the lower ends 16a, 17a encircling ring 12 for movement relative thereto. The upper ring 11 is positioned between such legs 16, 17 and in the ring-spaced position the relation of the rings 11, 12 will be as illustrated in FIG. 5 and when in collapsed position, the upper ring 11 will slide downwardly between such legs 16, 17 to allow the rings 11, 12 to nest while the legs 13 are splayed outwardly to hold the rings 11, 12 apart, one of the legs, 16 or 17 may be provided with a formed, locking detent 17b with the spring ability of the formed wire allowing the upper ring 11 to move therepast and thereafter lock the same in its uppermost position.

It should be noted, as illustrated in FIG. 3 that the leg units 13 are not allowed to freely slide about lower ring 12 but are relatively captured by pairs of crossbars 12a or the short abutment bars 12b which extend from a crossbar 12a to ring 12.

Figure 6:
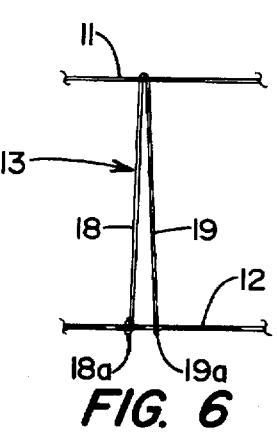
FIG. 6 is side elevation of a second form of connective device between the upper and lower lifter elements.

In the form of connective arrangement of FIG. 6, the legs 18, 19 of the connective member 13 are simply placed in relatively close relation with, again, the lower ends 18a, 19a encircling the lower ring 12. This side-by-side relation is equal to a slotted, single member wherein the upper ring 11 would slide within the slot and the lower end of such member would be pivotally attached to lower ring 12. In such a single, slotted member, a locating notch could be provided adjacent the upper end of such slot to capture the upper ring 11.

With either of the forms of the connective link 13, total collapsibility of the upper 11 to lower 12 ring is available. It should also be noted that with only the plurality of connective links 13 utilized, the unit basically forms an open-sided basket which will allow for passage of all materials except the desired foodstuff carried on the lower element 12 to pass therethrough.

It should also be noted that the handles 14, 15 of the unit 10 will always be in accessible position and will also collapse into low profile storage or shipping position.

Several obvious modifications of the connective member could be made without departing from the scope of the invention. The connective device is attachable to either of the lifter elements with the other of such elements sliding therewithin. The connective device could be a single, longitudinally extending member having a longitudinal slot therein to retain one of the lifter elements with one end thereof being pivotally attached to the other of said lifter elements.

It should be obvious that the applicant has provided a new and unique lifter for foodstuffs which provides multi-position useage and low profile storage and foodstuff accessibility.

What is claimed is:

1. A lifter for removal of foodstuffs from a cooking device which device is provided with inwardly slanted sides or an internal ledge along the sides thereof, said lifter including:
   a. a lower foodstuff supporting, liquid passing element receivable into the cooking device;
   b. an upper element of a size greater than the lower foodstuff supporting element to abut with the slanted sides or ledge of the cooking device to provide accessibility thereto and providing an open area thereacross to provide a basket shape to the same;
   c. triangularly shaped linkage means connecting said lower foodstuff supporting liquid passing element and said upper element;
   d. said triangularly shaped linkage means providing a pair of connected legs with each of said legs being respectively connected to said lower foodstuff supporting element and capturing said upper element therebetween, said linkage means permitting said upper element to be collapsed over said lower food supporting element when removed from the cooking device whereby said lower, food supporting element, upper element and linkage provide a {substantially} low profile configuration, said linkage being in outwardly splayed position when the lifter is removed from the cooking device and collapsed.

2. The lifter as set forth in claim 1 and said lower element providing an external boundary member of a predetermined size to be received in the lower area of a cooking device and providing a grid within said boundary member for support of foodstuffs thereon and liquid passage therethrough.

3. The lifter as set forth in claim 1 and said lower element providing an external boundary member of a size to be received in the lower area of the cooking device and providing a plurality of cross wires establishing a generally planar foodstuff and liquid passage support.

4. The lifter as set forth in claim 1 and said lower element being substantially planar and a plurality of support elements arranged on the underside of said lower element for elevating the same from the bottom of the cooking device.

5. The lifter as set forth in claim 1 and said upper element providing adjustment for decreasing and increasing the cross sectional dimension thereof for accomodation to the size of the cooking device to contact the sides or ledge thereof.

6. The lifter as set forth in claim 1 and said upper element providing an open area larger than the dimension of said lower element.

7. The lifter as set forth in claim 1 and said connective linkage means including a member of a configuration defining a longitudinally extending slot to receive a first of said lifter elements and being pivotally secured to the other of said lifter elements at one end thereof whereby said received element is slidable within said slot to collapse on the other of said elements for collapsing of the lifter to a low profile position.

8. The lifter as set forth in claim 1 and said connective linkage means including at least a pair of formed members providing legs to establish a V-shaped configuration with the free ends thereof pivotally connected to a first of said lifter elements and the second of said lifter elements being arranged within the defined V area.

9. The lifter as set forth in claim 8 and said legs being arranged adjacent to each other to provide a guiding slot between said legs.

10. The lifter as set forth in claim 8 and one of said legs having ring locating means thereon to removably capture the lifter element being moved between said legs.

11. The lifter as set forth in claim 1 and at least a pair of handles pivotally connected to said upper element for lifting of the entire unit and for collapsing thereof.

12. The lifter as set forth in claim 8 and said free ends of said V-shaped of said connective linkage means being pivotally connected to said lower foodstuff supporting element and said upper element being arranged within the V area.

* * * * *

UNITED STATES PATENT AND TRADEMARK OFFICE
CERTIFICATE OF CORRECTION

PATENT NO.  :  5,673,611

DATED       :  October 7, 1997

INVENTOR(S) :  Tiemann

It is certified that error appears in the above-identified patent and that said Letters Patent is hereby corrected as shown below:

On the title page, Item [76], Inventor name should read -- Tiemann --.

Signed and Sealed this

Fifth Day of May, 1998

Attest:

BRUCE LEHMAN

*Attesting Officer*         Commissioner of Patents and Trademarks